(12) United States Patent
Trabelsi et al.

(10) Patent No.: US 8,767,716 B2
(45) Date of Patent: *Jul. 1, 2014

(54) SYSTEMS AND METHODS OF ROUTING IP TELEPHONY DATA PACKET COMMUNICATIONS

(75) Inventors: Yariv Trabelsi, Jerusalem (IL); Baruch Sterman, Efrat (IL)

(73) Assignee: Vonage Network, LLC, Holmdel, NJ (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/236,065

(22) Filed: Sep. 19, 2011

(65) Prior Publication Data
US 2013/0070620 A1    Mar. 21, 2013

(51) Int. Cl.
*H04L 12/26* (2006.01)
*H04L 12/56* (2006.01)

(52) U.S. Cl.
CPC ............... *H04L 45/70* (2013.01); *H04L 45/22* (2013.01); *H04L 47/726* (2013.01)
USPC ........... 370/352; 370/248; 370/252; 370/389; 370/392; 379/1.04; 379/27.01; 709/239; 709/240

(58) Field of Classification Search
USPC .............. 370/241.1, 248, 252, 253, 352–356, 370/389, 392, 395.2, 395.21, 395.52, 370/412–418; 379/1.03, 1.04, 27.01, 27.02, 379/27.03, 27.04, 27.05, 27.06, 27.07, 379/27.08, 28, 32.01, 32.04; 375/224–228; 709/224–226, 228, 229, 231–235, 709/238–244
See application file for complete search history.

(56) References Cited

U.S. PATENT DOCUMENTS 6,816,464 B1    11/2004   Scott
7,995,464 B1 *   8/2011   Croak et al. ................... 370/218
(Continued)

FOREIGN PATENT DOCUMENTS

EP    1 973 305      9/2008
EP    2 117 190     11/2009

OTHER PUBLICATIONS

Rosenberg, Jdrosen Net J, Interactive Connectivity Establishment (ICE): A Protocol for Network Address Translator (NAT) Traversal for Offer/Answer Protocols; rfc5245.txt, Interactive Connectivity Establishment (ICE): A Protocol for Network Address Translator (NAT) Traversal for Offer/Answer Protocols; RFC5245.Txt. Internet Engineering Task Force, IETF; Standard, Internet Society (ISOC) 4, Rue Des Falaises CH-1205 GEN, Apr. 30, 2010, pp. 1-117, XP015070785.
International Search Report issued in PCT/US2012/052240 on Feb. 18, 2013.
Written Opinion issued in PCT/US2012/052240 on Feb. 18, 2013.

(Continued)

*Primary Examiner* — Hoon J Chung
(74) *Attorney, Agent, or Firm* — Nixon & Vanderhye P.C.; Joseph Pagnotta

(57) ABSTRACT

Systems and methods of selecting a media path for data packets bearing the media of a telephone call to traverse during a voice over Internet protocol telephone call include testing the call quality of multiple potential media paths immediately before a call is setup. The potential media path with the highest call quality is used as the initial media path for the call. If the call quality of the media path currently in use declines below a threshold value during a call, potential alternate media paths are identified and tested for call quality. If one of the alternate media paths has better call quality than the media path presently in use, the call is switched to the alternate media path with the highest call quality.

16 Claims, 9 Drawing Sheets

(56) References Cited

U.S. PATENT DOCUMENTS

| | | | |
|---|---|---|---|
| 8,184,537 B1* | 5/2012 | Gopal et al. | 370/235 |
| 2004/0136324 A1 | 7/2004 | Steinberg et al. | |
| 2006/0256738 A1* | 11/2006 | Kenoyer et al. | 370/260 |
| 2007/0283042 A1 | 12/2007 | West et al. | |
| 2009/0274040 A1* | 11/2009 | Karacali-Akyamac et al. | 370/216 |
| 2010/0250747 A1* | 9/2010 | Karaoguz et al. | 709/226 |
| 2011/0216760 A1* | 9/2011 | Murphy et al. | 370/352 |
| 2013/0070755 A1* | 3/2013 | Trabelsi et al. | 370/352 |

OTHER PUBLICATIONS

Tao et al., Improving VOIP Quality Through Path Switching; Reprinted From IEEE INFOCOM 2005; Proceedings of the 23rd Annual Conference; Mar. 13, 2005; pp. 13 (total).

Ghanassi et al., Optimizing Voice-Over-IP Speech Quality Using Path Diversity; Multimedia Signal Processing, Mar. 3, 2006—IEEE 8th Workshop; pp. 6 (total).

Liang et al., Multi-Stream Voice Over IP Using Packet Path Diversity; Multimedia Signal Processing, Oct. 2, 2001—IEEE Fourth Workshop; pp. 6 (total).

* cited by examiner

|  | 1st PATH | | | 2nd PATH | | | 3rd PATH | | | 4th PATH | | | 5th PATH | | |
| --- | --- | --- | --- | --- | --- | --- | --- | --- | --- | --- | --- | --- | --- | --- | --- |
|  | MR1 | MR2 | Q | MR1 | MR2 | Q | MR1 | MR2 | Q | MR1 | MR2 | Q | MR1 | MR2 | Q |
| LOCATION A TO LOCATION B | 101 | 104 | 5.2 | 101 | 108 | 4.8 | 101 | 110 | 4.1 | 102 | 111 | 4.0 | 102 | 110 | 4.0 |
| LOCATION A TO LOCATION C | 101 | 130 | 6.0 | 101 | 132 | 5.1 |  |  |  |  |  |  |  |  |  |
| LOCATION A TO LOCATION D | 101 | 141 | 3.2 | 101 | 143 | 3.2 | 102 | 150 | 3.0 | 102 | 148 | 2.8 |  |  |  |
| LOCATION B TO LOCATION C | 104 | 130 | 6.1 | 104 | 132 | 6.0 | 110 | 132 | 4.8 |  |  |  |  |  |  |
| LOCATION B TO LOCATION D | 104 | 141 | 5.5 | 110 | 141 | 5.1 | 111 | 143 | 5.0 | 111 | 148 | 2.1 |  |  |  |
| LOCATION C TO LOCATION D | 130 | 141 | 4.8 | 132 | 141 | 4.0 | 132 | 132 | 3.8 |  |  |  |  |  |  |
| LOCATION A TO LOCATION E | 101 | 160 | 4.1 | 102 | 160 | 4.0 | 102 | 161 | 3.6 |  |  |  |  |  |  |
| LOCATION B TO LOCATION E | 104 | 160 | 7.8 | 104 | 161 | 5.0 | 110 | 161 | 5.0 |  |  |  |  |  |  |
| LOCATION C TO LOCATION E | 130 | 160 | 6.5 | 132 | 160 | 4.8 | 132 | 161 | 4.0 |  |  |  |  |  |  |

FIGURE 5

SYSTEMS AND METHODS OF ROUTING IP TELEPHONY DATA PACKET COMMUNICATIONS

BACKGROUND OF THE INVENTION

The invention is related to Internet Protocol (IP) telephony systems. More specifically, the invention is related to systems and methods for routing the data packets that carry communications enabled by an IP telephony system, such as telephone calls and text or video messages.

Existing IP telephony systems allow users to place and receive telephone calls or to send and/or receive other types of communications, such as text messages, SMS messages, MMS messages and the like. The communications are transmitted, at least in part, by data packets that traverse a private and/or public data network.

For example, a calling party can place a telephone call to a called party using an IP telephony device that is coupled to a private or public data network. When the user requests that the call be placed, an IP telephony system receives the request and sets up the call between the calling party's telephony device and the called party's telephony device. The called party's telephony device can also be an IP telephony device that is coupled to a private or public data network. Alternatively, the called party's telephony device could be an analog telephone that is coupled to a publicly switched telephone network (PSTN). In still other instances, the called party's telephony device could be a cellular telephone or a mobile computing device with cellular telephone capabilities that is coupled to a cellular telephony network.

Typically, an IP telephony system receives a call setup request from the calling party's telephony device at an inbound proxy server (or an originating gateway). The inbound proxy server consults a routing engine to determine how to setup the telephone call to the called party's telephony device.

If the called party's telephony device is another IP telephony device coupled to a data network, this would typically mean determining the identity of another server that can deliver data packets to the called party's IP telephony device. The server that is capable of delivering data packets to the called party's IP telephony device may be referred to as a destination Proxy Server or Session Border Controller (SBC).

If the called party's telephony device is an analog telephone coupled to a PSTN or a cellular telephone coupled to a cellular telephone network, this would typically mean determining the identity of a destination gateway that is capable of interacting with the relevant PSTN or cellular telephone network. In this instance, the IP telephony system would deliver data packets bearing the media of the telephone call to the PSTN or cellular telephone network, and the PSTN or cellular telephone network would convert the data packets into appropriate signals, and then send those signals to the called party's telephony device.

The quality of a telephone call, or any other type of communication carried in this fashion, is highly dependent on how well the data packets carrying the media of the telephone call are being transmitted over the relevant private and/or public data networks. If data packets are being lost, call quality will deteriorate. If transmitted data packets are being significantly delayed, call quality will deteriorate. Another problem is jitter, where the latency or delay is variable in nature. If jitter becomes a problem, call quality also will deteriorate.

Presently, IP telephony systems have only limited control over the physical path that the data packets bearing the media of a telephone call travel as they pass over public and private data networks. In some cases, the only aspect that can be controlled is the identity of the inbound and outbound gateways, Session Border Controllers, or media servers.

For these reasons, some IP telephony systems track the quality of data transmissions passing through the inbound and outbound gateways, SBCs, or media severs that it routinely uses to transmit data communications. This can be accomplished by periodically conducting testing to determine data packet transmission statistics for data packet transmissions passing through individual gateways or servers. As noted above, the data packet transmission statistics can include delay, packet loss, jitter, and other measures. The results of such testing is correlated in databases which provide information on the relative quality provided by each of the gateways or servers.

When a new call setup request is received at an inbound proxy server of an IP telephony system, the inbound proxy server consults a routing engine to determine the best outbound gateway or server to use to complete the call to the called party's telephony device. If multiple outbound gateways or servers are capable of completing the call, the routing engine typically takes the call quality provided by each of the outbound gateways or servers into account when determining which outbound gateway or server to recommend to the inbound proxy server.

Databases indicating the call quality provided by various gateways or servers are necessarily based on historical data which has been collected over an extended period of time. As a result, the historical databases are really a prediction of the likely call quality that the various gateways or servers can presently provide, based on how well the gateways or servers performed in the past. But there is no guarantee that a gateway or server that performed well in the past will perform well for a new call that is just being setup.

Moreover, the data packets that carry the communications between a calling party's telephony device and a called party's telephony device may traverse multiple private and/or public data networks. For example, a call established between a calling party's IP telephony device and a called party's analog telephone might traverse three separate data networks.

During a first hop, the data packets would traverse the public Internet between the calling party's IP telephony device and the inbound gateway or media server of the IP telephony system. The traversal of the public Internet could itself involve multiple separate hops between various nodes of the public Internet. Two consecutive data packets generated by the calling party's telephony device could traverse vastly different paths as they make their way between the calling party's telephony device and the inbound gateway or media server of the IP telephony system.

During a second hop, the data packets could traverse a private data network maintained by the IP telephony system as the data packets travel between the inbound gateway or media server and the outbound gateway or media server. In other instances, the inbound gateway or media server may be controlled by the IP telephony system, and the outbound gateway or media server could be operated and controlled by a separate partner service provider. In that instance, the IP telephony system will likely route the data packets from the inbound gateway or media server to the outbound gateway, SBC, or media server (maintained by the partner service provider) over the public Internet. Here again, this would likely involve multiple separate hops between different nodes of the public Internet.

If the call is directed to a called party's analog telephone that is connected to a PSTN, the outbound gateway or media server would deliver the data packets to the PSTN. But the PSTN itself might carry the call as data packets through a private data network until the data packets arrive at a gateway or server that is located near the called party's analog telephone. At that point, the data packets would be converted into analog signals that are transmitted to the called party's analog telephone over the PSTN. Thus, the data packets may also be carried over a private data network maintained by the PSTN. This same basic process also occurs if the called party's telephony device is provided with service from a second IP telephony system.

The multiple hops along all these various transmission devices can lead to significant transmission delays that negatively affect call quality. Also, when so many different devices are responsible for the delivery of the data packets, there are many potential sources of error which can result in delay, lost packets, and problems with jitter. And, as noted above, with the present system of routing telephone calls, about the only aspect that the IP telephony system can control is the quality of the transmission path between the inbound gateway or media server and the outbound gateway or media server. Further, even that control is exerted using only historical call quality data that provides no guarantee that the inbound and outbound gateways or media servers selected for a new call will provide the same call quality for the new call as they did for previous calls.

In an attempt to address the above-discussed problems a new Voice over Internet Protocol routing specification has been developed that provides greater control over how data packets bearing the media of an IP telephone call are routed between a calling party's telephony device and a called party's telephony device. The new specification, which is called Interactive Connectivity Establishment (ICE) is explained in detail in IETF RFC 5245, by Jonathan Rosenberg, published Apr. 1, 2010, the contents of which are hereby incorporated by reference.

When the ICE specification is used to route an IP telephone call, the signaling that sets up the call still traverses the lengthy, multiple hop path described above. However, the ICE specification makes it possible to route the data packets bearing the media of the telephone call in a more direct and controlled fashion. Under the ICE method, the calling party's telephony device and the called party's telephony device communicate with one another during call setup to determine the best way to route data packets between each other. During this process, each of the telephony devices will compile a list of media relays that could be used to route data packets to and from itself. The calling party's telephony device sends its candidate list to the calling party's telephony device, and vice versa.

Each telephony device then creates a list of candidate pairs that could be used to communicate data packets between the calling party's telephony device and the called party's telephony device. Each pair includes one candidate from the calling party's list and one candidate from the called party's list. The candidate pairs are ranked based upon some ranking scheme that is intended to predict which candidate pairs will likely result the best communications. Note, these rankings are not based upon any real world or real-time testing. The rankings are simply based upon a predetermined rules that attempt to predict which candidate pairs will provide the best communication paths.

At least one of the telephony devices will then attempt to send a message to the other telephony device using the highest ranked candidate pair on the list. If the message is received by the other telephony device, it sends back a response. The telephony devices start with the highest ranked candidate pairs. And as soon as one of the candidate pairs succeeds in providing a communication path in both directions, the telephony devices will use that candidate pair to communicate data packets bearing the media of the telephone call. If the highest ranked candidate pair fails to provide an effective two-way path between the telephony devices, the telephony devices move on to the next-highest ranked candidate pair.

While the ICE specification ensures that the pair of media relays that is initially used to route data packets between a calling party's telephony device and a called party's telephony device will be operable, there is no guarantee that the selected pair of media relays will provide high call quality. As noted above, no real time or real world testing is performed to verify which of the candidate pairs will provide the best quality. Instead, the rankings are only based upon predicative predetermined rules. Also, the first candidate pair that provides two way communications is used as the path for the call. This means that if the first candidate pair works, but provides poor call quality, and the second candidate pair on the list would have provided excellent call quality, the call will still be established over the lower quality path between the first candidate pair.

BRIEF DESCRIPTION OF THE DRAWINGS

FIG. 5 is a diagram illustrating a database of potential data transmission paths and associated call quality ratings;

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
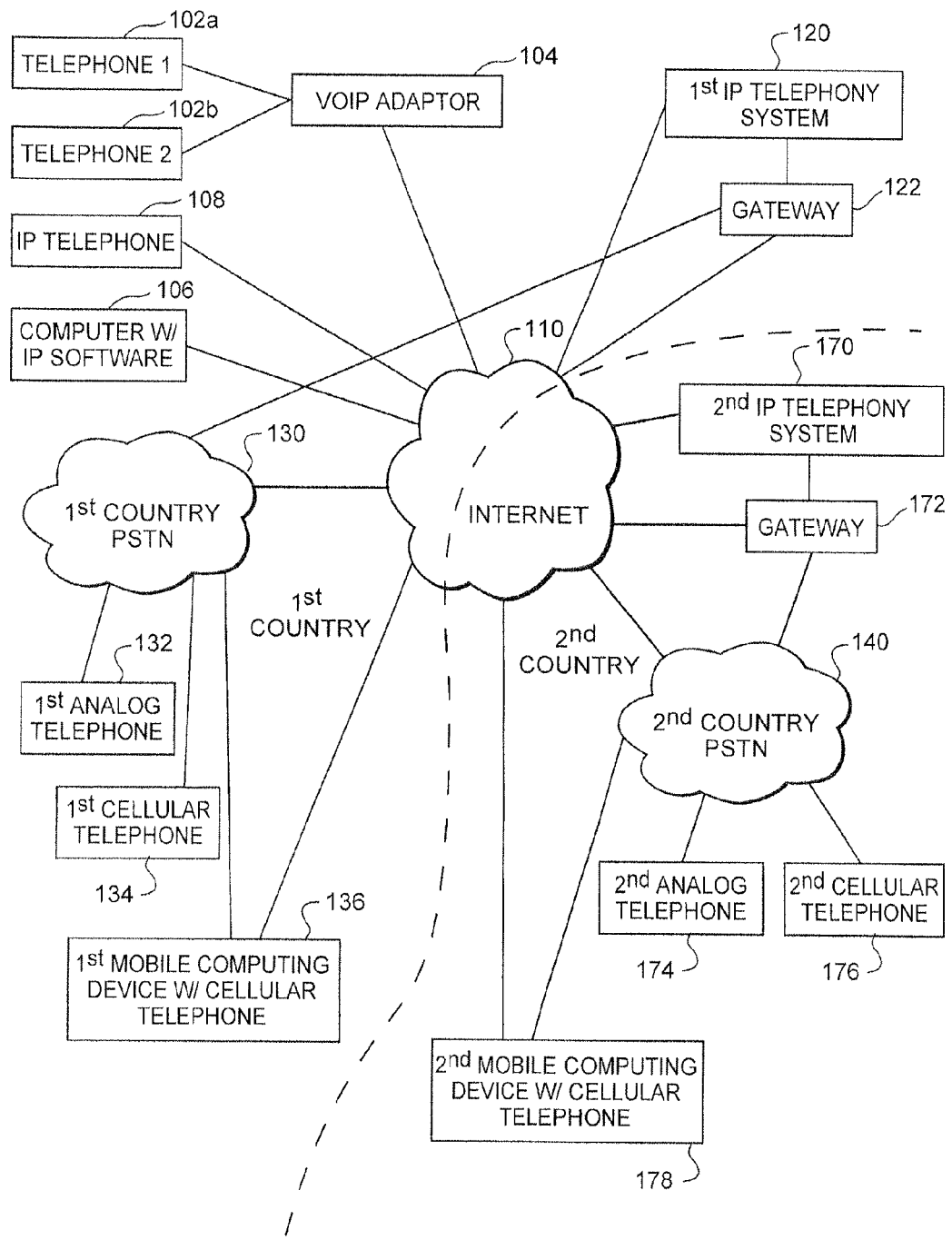
FIG. 1 is a diagram of a communications environment including various elements which are associated with an Internet protocol (IP) telephony system operating in accordance with the invention.

As illustrated in FIG. 1, a communications environment is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a first publicly switched telephone network (PSTN) 130 and a second PSTN 140 via one or more gateways 122.

The gateway 122 allows users and devices that are connected to the first and second PSTNs 130, 140 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephone devices 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephone capabilities could also be used to place telephone calls to customers of the IP telephony system. The first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170.

The second IP telephony system could also interact with customers of a second PSTN 140 via a gateway 172. The second PSTN 140 may be connected to a second analog telephone 174, a second cellular telephone 176 and a second mobile computing device 178.

In the following description, we will assume that the first IP telephony system 120, the first PSTN 130, the IP telephone 108, the VOIP adaptor 104, the first analog telephone 132, the first cellular telephone 134 and the first mobile computing device 136 are all located in a first country. Also, the second IP telephony system 170, the second PSTN 140, the second analog telephone 174, the second cellular telephone 176 and the second mobile computing device 178 are all located in a second country.

Figure 2:
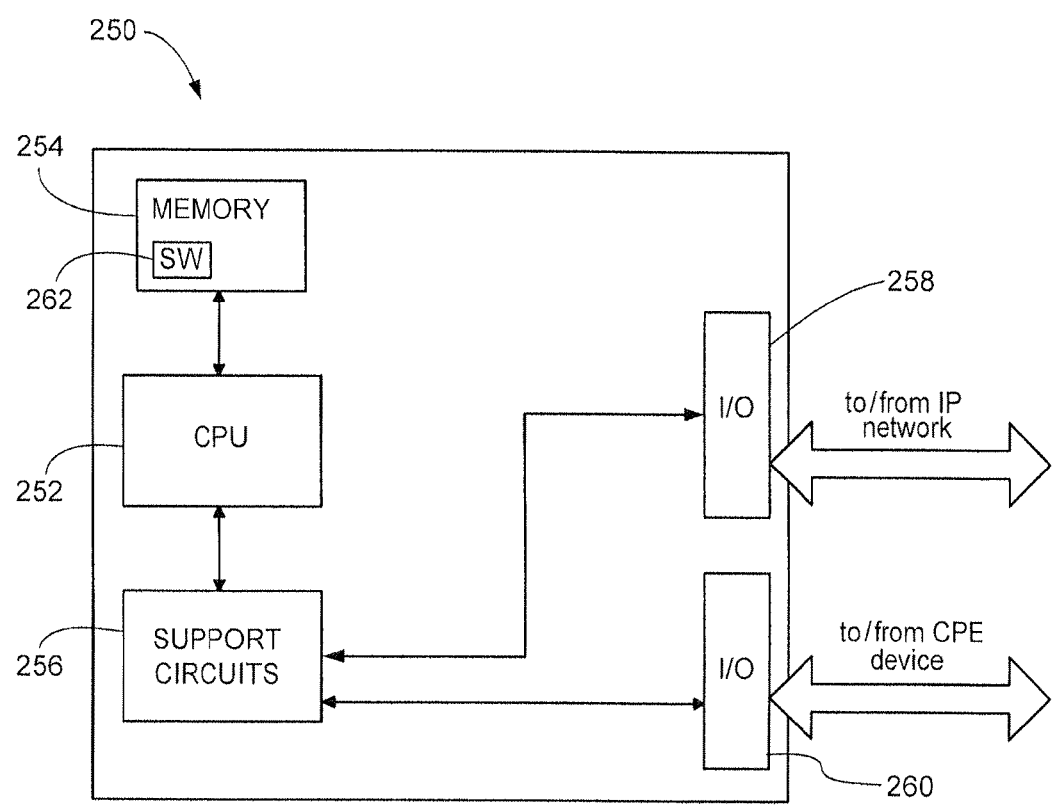
FIG. 2 is a diagram of various elements of a processor that forms part of an IP telephony system.

FIG. 2 illustrates elements of a computer processor 250 that can be used as part of the first or second IP telephony systems 120, 170 to accomplish various functions. Each of the IP telephony systems 120, 170 could include multiple processors 250 located at various locations in the system, along with their operating components and programming, each carrying out a specific or dedicated portion of the functions performed by the IP telephony systems 120, 170.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260260 for connecting the processor 250 to customer equipment and to service provider equipment, as well as possibly one or more input/output devices (not shown) for accessing the processor and/or performing ancillary or administrative functions related thereto. The provisions 258/260260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can than be run so that the Apple iPod touch can interact with an IP telephony system to conduct a telephone call.

The following description will also refer to telephony communications and telephony activity. These terms are intended to encompass all types of telephone calls, regardless of whether all or a portion of the calls are carried in an analog or digital format. These terms are also intended to encompass data communications that are conveyed through a PSTN or VOIP telephony system, such as facsimile transmissions, text messages, SMS messages, MMS messages, video messages, and all other types of data communications sent by or received by a user. In other words, these terms are intended to encompass any communications whatsoever, in any format, which traverse all or a portion of a communications network or telephony network.

The inventors have developed alternate methods of routing the data packets bearing the media of a telephone call which can provide more reliable call quality than the ICE specification. Under the inventors' methods, actual tests of data packet transmissions though multiple potential paths between a calling party's IP telephony device and a called party's telephony device are conducted during the initial call setup procedure. The test results are then used to select the path which offers the best call quality at the time the call is being setup. Also, the call quality is monitored as the call progresses. If the call quality on the selected path deteriorates below a threshold level, tests are again conducted on multiple potential alternate paths. If one of the alternate paths offers better call quality, the call is switched from the initial path to the alternate path having the best call quality at that point in time.

Because tests of call quality on various potential paths are conducted at the time the call is being connected, the inventors' methods ensure that the initial path selected for the call is actually working better than any of the other potential paths. Also, if it becomes necessary to switch the call to an alternate path, the inventors' methods ensure that the call is switched to an alternate path that is currently providing the best quality, as compared to the existing path, or the other alternate paths.

Before discussing the details of the inventors' routing methods, we will first review the elements used to accomplish the routing. Thereafter, details of the routing methods will be explained.

Figure 3:
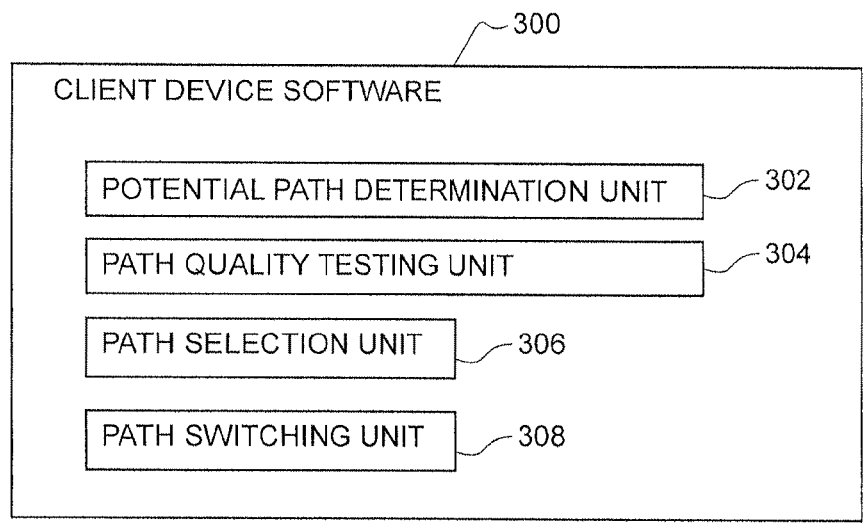
FIG. 3 is a block diagram illustrating elements of software which can be run on an IP telephony device to control the routing of data packet communications that will carry telephone calls and other forms of telephony communications.

Software resident on the calling party's telephony device, and possibly also on the called party's telephony device, is used to select the path that will be used for the media of an IP telephone call. FIG. 3 illustrates some of the major elements of that software.

As shown in FIG. 3, the client software 300 includes a potential path determination unit 302 which operates to generate a list of potential paths that could be used to communicate data packets between the calling party's telephony device and the called party's telephony device. Each path would include one or more media relays through which data packets will be routed, similar to the ICE specification explained above. In some instances, only a single media relay will be included in a path. In other instances, two media relays will be included in a path. In still other instances, more than two media relays will be included in each path.

The potential path determination unit 302 may generate a list of potential paths based on available information. In other embodiments, the potential path determination unit 302 may obtain a list of potential paths from a path engine of an IP telephony system, as will be described in more detail below. The potential path determination unit may also generate a list of potential paths based, at least in part, on communications exchanged with the called party's telephony device, or with an element of an IP telephony system or a PSTN that will be responsible for delivering the data packets to the called party's telephony device.

The client software also includes a path quality testing unit 304 which tests for call quality on each of multiple potential paths that have been identified by the potential path determination unit 302. Testing for call quality along a path involves sending test data packets back and forth between the media relays of the path. Measures of the test data transmissions are taken, such as packet loss, delay, jitter, and other related measures Those measures are then used to determine a call quality measure for the path. The actual data transmission measures used, and the way those measures are combined to arrive at a call quality measure could vary over time or depending on the type of path being evaluated, or the number and types of media relays within a path.

For example, a mean opinion score (MOS) and/or a perceptual evaluation of speech quality (PESQ) measure may be calculated for potential paths. These measures are determined by relatively complex algorithms that take into account things like packet loss, jitter and delay. Those measures could then be used to select the best initial media path for the call.

The client device software 300 also includes a path selection unit 306 that will evaluate the results provided by the path quality testing unit 304. The path selection unit 306 may take other information about a potential path into account, such as historical data, and information indicative of how the quality of a path changes at different times of the day, or on different days of the week. This additional information may be obtained from a path engine of an IP telephony system (as explained in greater detail below), or from other sources. Based on all the available data, the path selection unit 306 then selects the initial path that is to be used for a call.

The client device software 300 also includes a path switching unit 308. As will be described in more detail below, once a telephone call has been established on an initial path between the calling party's telephony device and the called party's telephony device, the path switching unit 308 monitors the call quality of the initial path. If the call quality deteriorates below a threshold value during the call, the path switching unit 308 acts to re-route the call to a path offering better call quality.

In alternate embodiments, the path switching unit 308 monitors the call quality of both the path that is currently in use, and the call quality on one or more alternate paths as the call progresses. If the call quality on an alternate path rises to a level that is significantly higher than the call quality of the path that is currently in use, the path switching unit 308 will cause the call to switch to the higher quality alternate path.

Figure 4:
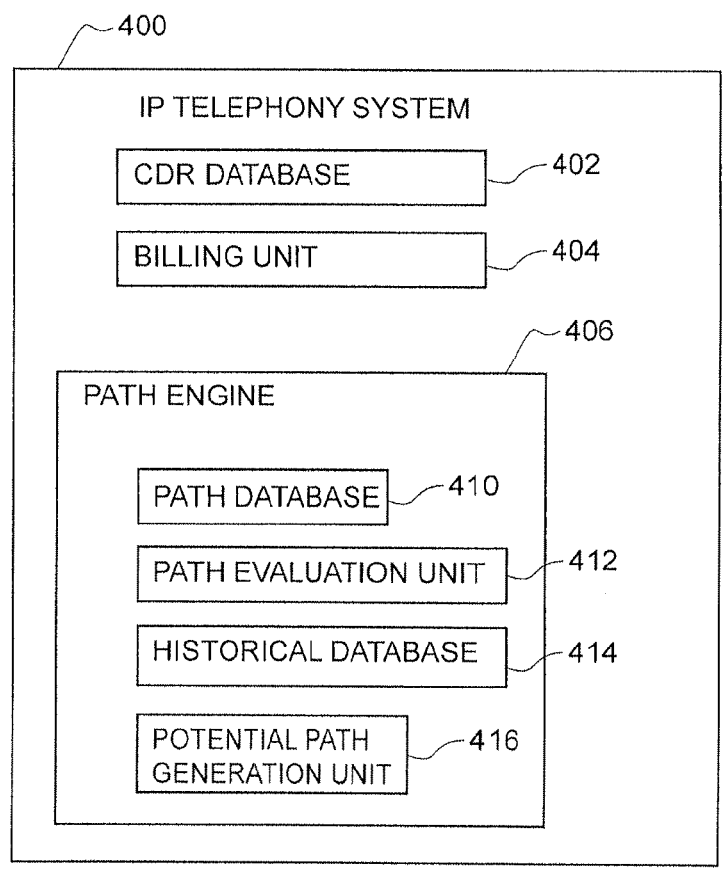
FIG. 4 is a diagram illustrating selected elements of an IP telephony system which includes a path engine that supplies recommended data transmission paths to IP telephony devices.

As mentioned above, the call path determination unit 302 of the client device software may obtain a list of potential paths from a path engine of an IP telephony system. FIG. 4 illustrates an IP telephony system 400 that includes a Call Detail Record (CDR) database 402, a billing unit 404, and a path engine 406.

The path engine 406 identifies potential media paths that can be used for data communications between different locations. The path engine also conducts periodic testing of the data transmissions that can be achieved through those paths. The path engine then assigns a quality rating to each potential path. The quality rating can be based on just the testing, or on both testing and historical data of past quality offered through the potential paths. The identified potential paths and the quality ratings are then stored in a database.

As illustrated in FIG. 4, the path engine 406 includes a path database 410. As noted above, the path database lists combinations of media relays that can be used to communicate data between different locations. The database may also include a quality rating for each path. The quality ratings could be based on data packet transmission tests that are conducted by the path evaluation unit 412 of the path engine 406. As mentioned above, the quality rating could be based on a MOS or PESQ measure that is calculated based on certain data packet transmission statistics. In some embodiments, the path evaluation unit 412 periodically sends a stream of data packets between the media relay pair of each path to test how well data packets are being communicated between the media relay pair. This could include compiling packet loss, delay, jitter and other transmission statistics for the test data packets. The results of this testing could then be evaluated to determine a quality rating for the path.

The path engine may also include a historical database 414 which includes historical data about the data transmission quality provided by paths between media relay pairs. The historical data could include information about how the data transmission quality of a path varies based on the time of day, the day of the week, or some other time varying characteristic. This historical database might also include long term averages of the data transmission quality offered by various paths.

The path evaluation unit 412 may take the information in the historical database 414 into account, along with the test data, in determining a quality rating for a particular path. Thus, the quality ratings listed in the path database 410 may be based on more than just actual test data.

The paths in the database are periodically retested so that the quality ratings in the database remain reliable. As a result, the ordering of the individual paths can shift over time as the quality ratings change. Also, a quality rating for a path might change between retesting steps if the path is known to have a time varying nature. For example, if it is known that the quality of a path will get better or worse during certain times of the day or during certain days of the week, the quality rating of the path may be updated between retesting steps to reflect this aspect of the path quality.

In some embodiments, when a user requests that a call be setup between his telephony device and a called party's telephony device, the potential path determination unit 302 of the client device software 300 on the user's telephony device sends a query to the path engine 406 of an IP telephony system. This query is received by a potential path generation unit 416. The potential path generation unit 416 consults the path database 410 to determine what paths are available to communicate data packets between the calling party's telephony device and the called party's telephony device. The potential path generation unit 416 then sends a list of potential paths to the potential path generation determination unit 302 of the client device software 300 on the calling party's telephony device.

The list of potential paths sent to the calling party's telephony device can simply be a list of media relays in each path. The list of paths may be provided in the order of the quality ratings. The list provided to the calling party's telephony device might also include the actual quality ratings from the path database 410. In some instances, the list may identify the media relays based on a special nomenclature. In other instances, the IP addresses of the media relays in each path may be provided as part of the list.

The path database can take the general form illustrated in FIG. 5. FIG. 5 is just one representation of how the path database 410 could be organized. The path database 410 could also be formatted in multiple different alternative ways. Also, a path database will not necessarily include a quality rating for each path. In the path database illustrated in FIG. 5, combinations of locations are listed down the left hand side of the table. One or more paths are then listed for each location pair. In this embodiment, each path includes a pair of media relays that can be used to communicate data packets between the two locations. In the example shown in FIG. 5, there is also a quality rating for each path. In alternate embodiments, more than two media relays could be included in one or more of the paths.

As illustrated in FIG. 5, the paths for each pair of locations may be listed in the order of the data transmission quality they provide. In the table illustrated in FIG. 5, the path with the highest quality rating is always listed as the first path. The path with the next-highest quality rating appears second, and so forth.

In an alternate embodiment, when a user requests that a call be setup between his telephony device and a called party's telephony device, the potential path determination unit 302 of the client device software 300 on the user's telephony device obtains or generates a list of potential paths in some other fashion. For example, the potential path determination unit 302 could cause a process to be performed that is identical or similar to the one that is performed according to the ICE specification described above. This would involve communicating with the called party's telephony device to generate a list of potential media relay pairs that could be used to communicate data between the calling party's telephony device and the called party's telephony device.

Figure 6:
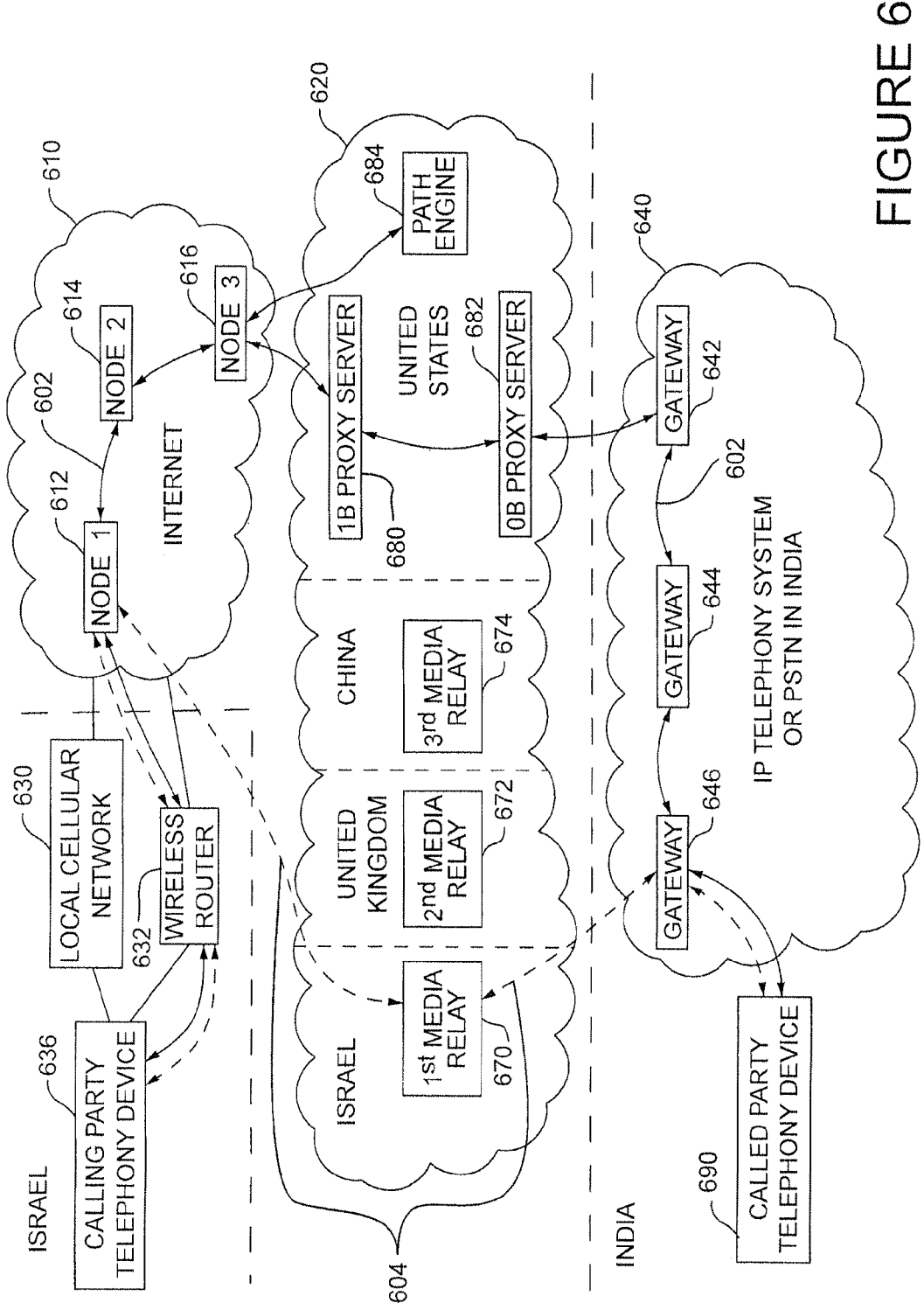
FIG. 6 is a diagram illustrating elements of an IP communication environment that shows how call setup signaling and media data traverse paths across the IP communication environment.
Figure 7:
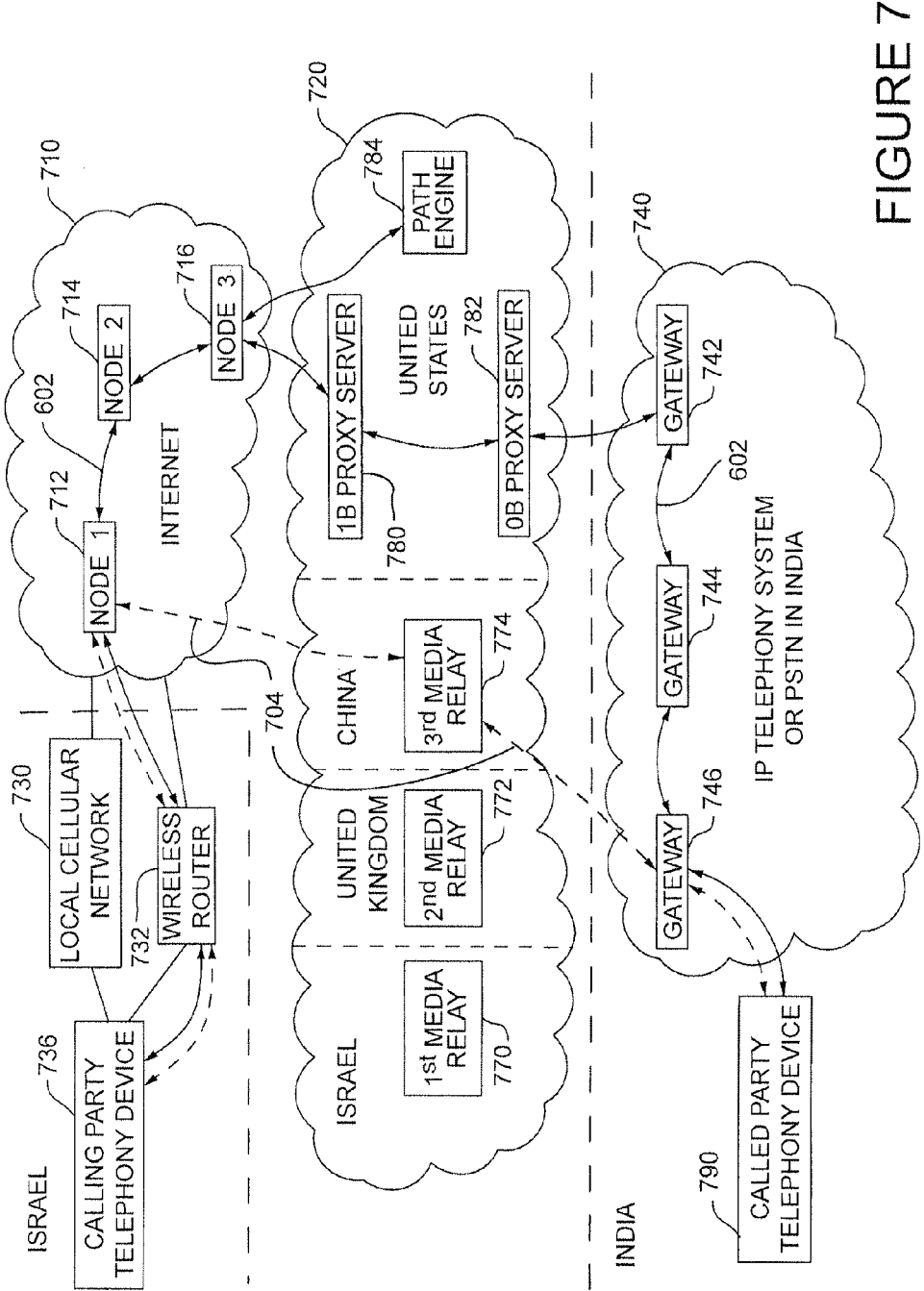
FIG. 7 is another diagram illustrating elements of an IP communication environment that shows how call setup signaling and media data traverse paths across the IP communication environment.
Figure 8:
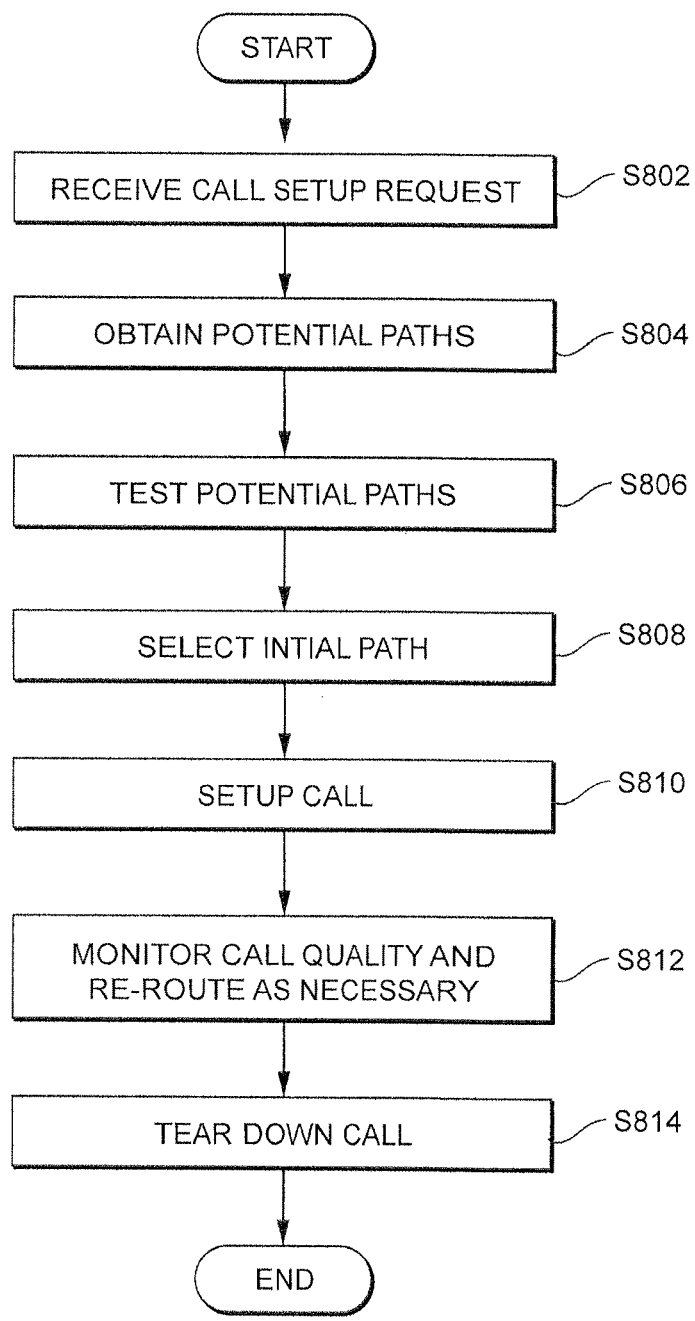
FIG. 8 is a diagram illustrating steps of a method of setting up and routing a call in an IP communication environment.

A method of setting up a telephone call between a calling party's telephony device and a called party's telephony device will now be explained with reference to FIGS. 6-8. FIGS. 6 and 7 illustrate elements of a communication environment in which the call will be established. FIG. 8 illustrates steps of a method of setting up and maintaining the call.

FIG. 6 illustrates that a calling party's telephony device 636 is located in Israel. The calling party's telephony device 636 would include client device software as illustrated in FIG. 3. The calling party's telephony device 636 is capable of communicating over a local cellular network 630, or through a wireless router 632 to send data packets to and receive data packets from the Internet 610. For purposes of this explanation, we will assume that the calling party telephony device 636 utilizes the wireless router 632 to access the Internet 610.

In this example, the calling party's telephony device 636 will be attempting to establish a call with a called party's telephony device 690 located in India. The called party's telephony device 690 is provided with telephone service by an IP telephony system or PSTN 640 that is also located in India. The IP telephony system or PSTN 640 includes a plurality of gateways 642, 644, 646.

The calling party's telephony device 636 obtains telephony service from an IP telephony system 620, which can be located anywhere. In the example illustrated in FIGS. 6 and 7, the IP telephony system 620 maintains a plurality of media relays in various geographic locations. In one embodiment, a first media relay 670 is located in Israel, a second media relay 672 is located in the United Kingdom and a third media relay 674 is located in China. In addition, the IP telephony system 620 has an inbound proxy server 680 and an outbound proxy server 682, as well as a path engine 684 in locations other than the locations of the media relays, such as in the United States.

With reference to FIG. 8, in step S802, when a user of the calling party's telephony device 636 dials the telephone number of the called party's telephony device 690, the client device software 300 on the calling party's telephony device 636 receives this command as a call setup request. In step S804, the potential path determination unit 302 of the client device software 300 will generate or obtain a list of potential paths that can be used to communicate with the called party's telephony device 690. This could be accomplished in multiple different ways.

In some embodiments, the potential path determination unit 302 on the calling party's telephony device 636 would engage in communications with the called party's telephony device 690 to negotiate a list of potential media relay pairs. This would be similar to the actions that are performed under the ICE specification, as described above.

In this situation, the signaling between the calling party's telephony device 636 and the called party's telephony device 690 would travel via a signaling path 602 denoted by solid lines with arrows appearing in FIG. 6 (note, only a portion of all the hops made by the signaling path 602 are labeled for the sake of clarity in the drawing). This means the call setup signals would travel from the calling party's telephony device 636 to the wireless router 632, then on to a first node 612 of the Internet 610. The signaling would pass through second and third nodes 614, 616 of the Internet 610, and then on to the inbound proxy server 680 of the IP telephony system 620. The IP telephony system would select an outbound proxy server 682 that can pass the signals off to the IP telephony system or PSTN in India 640 that provides service to the called party's telephony device 690. Thus, the signaling would pass to the outbound proxy server 682, and then to a gateway 642 of the IP telephony system or PSTN in India 640. The signaling would travel between two other gateways 644 and 646 before ultimately being delivered to the called party's telephony device 690.

All of the signaling that passes back and forth between the calling party's telephony device 636 and the called party's telephony device 690 as they negotiate a list of potential paths that can be used to carry the media of the telephone call will traverse this same path shown by the solid arrowed lines in FIG. 6.

In an alternate embodiment, the potential path determination unit 302 on the called party's telephony device 636 sends a query to the path engine 684 of the IP telephony system 620 asking for a list of potential paths that could be used to establish a telephone call. As explained above, a potential path generation unit 416 of the path engine 684 would return a list of paths to the calling party's telephony device 636.

Once the potential path determination unit 302 of the client device software on the calling party's telephony device 636 has a list of potential paths, in step S806, a path quality testing unit 304 on the calling party's telephony device 636 conducts testing of each path to determine how well each path can communicate data packets. When the testing is complete, in step S808, the path selection unit 306 of the client device software on the calling party's telephony device 636 selects an initial media path 604 for the media of the telephone call. As noted above, the selection could be made based on the test results alone, or based on the test results and additional information, such as historical data. The selection of the initial path may also be based on a quality rating for the paths that has been sent back by the path engine 684 of the IP telephony system 620.

FIG. 6 indicates that the initial media path 604 selected by the path selection unit 306 of the client device software on the calling party's telephony device 636 is the first media relay 670 located in Israel and the gateway 646 in the IP telephony system or PSTN in India 640. The dashed line with arrows indicates the initial path 604 that media packets will travel between the calling party's telephony device 636 and the called party's telephony device 690. As stated earlier with respect to the signaling path 602, only a portion of the initial media path 604 hops are labeled for the sake of clarity in the drawings, but the media path includes all dashed lines in FIG. 6. Once the selection is made, in step S810 the call is setup along the selected initial path 604.

In step S812, a path switching unit 308 of the client device software on the calling party's telephony device 636 monitors the call quality on the initial path 604 while the call continues. If the call quality deteriorates below a threshold amount, or if the call quality on an alternate path becomes significantly better than the call quality on the initial path 604, the path switching unit will cause the media to switch to an alternate path offering better call quality.

FIG. 7 illustrates that the path switching unit 308 of the client device software on the calling party's telephony device 636 decided to switch the call to an alternate media path 704 that includes the third media relay 674 in China, and the same gateway 646 that is part of the IP telephony system or PSTN in India 640. As stated above with respect to FIG. 6, the alternate media path 704 is denoted by all dashed lines in FIG. 7.

Finally, once one of the parties hangs up or otherwise terminates the call, in step S814 the call would be ended. The tear down procedures could include storing a final call detail record for the call in the IP telephony system 620 so that the calling party can be billed for the call.

Figure 9:
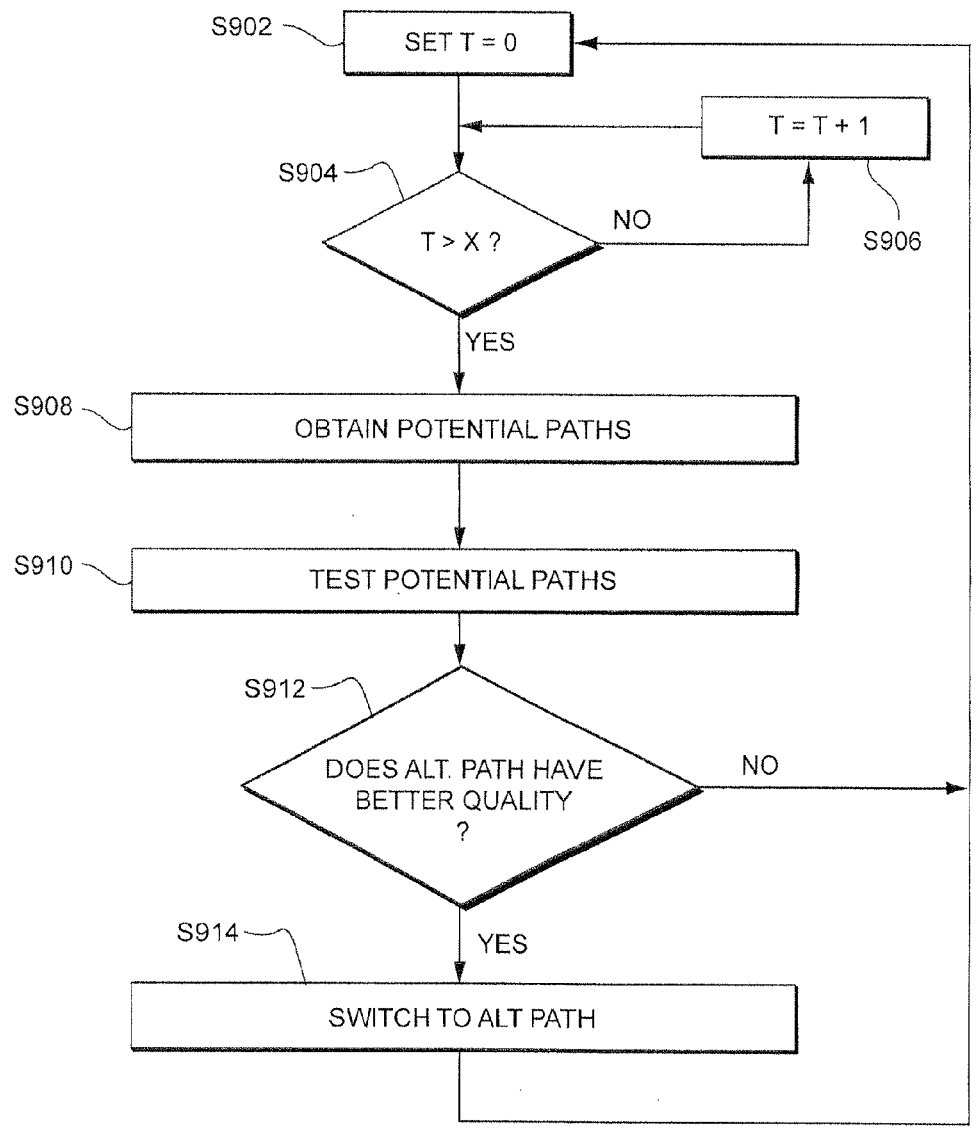
FIG. 9 is a diagram illustrating steps of a method of monitoring call quality and rerouting a call.

As explained above, once a call has been started over an initial path, the path switching unit 308 of the client device software on the calling party's telephony device 636 monitors the call quality over the initial path. The call is switched to an alternate path under certain circumstances. This monitoring and potential switching of the path is step S812 of the method illustrated in FIG. 8. FIG. 9 illustrates one method which corresponds to the monitoring and switching step.

The method illustrated in FIG. 9 begins in step S902, where a time counter T is set to 0. The method proceeds to step S904, where a check is performed to determine if the value of the time counter T exceeds a predetermined value X. If not, the method proceeds to step S906, where the time counter T is indexed. The method then loops through steps S904 and S906 until the value of the time counter T is greater than X, at which point the method proceeds to step S908.

In step S908, all potential paths for the ongoing telephone call are again obtained. However, in alternate embodiments, this step is not performed, and the list of potential paths that was originally obtained during call setup is reused.

The method then proceeds to step S910, where the potential paths are re-tested. In step S912, the client device software determines if an alternate path has better call quality than the path that is currently in use for the call. If not, the method loops back to step S902, and the steps described above are repeated.

If the result of the determination in step S912 indicates that an alternate path offers better call quality than the path presently in use, the method proceeds to step S914, where the call is switched to the alternate path with better call quality. Thereafter, the method loops back to step S902.

The analysis performed in step S912 could simply be a determination about whether any of the alternate paths offer better call quality than the path presently in use. In alternate embodiments, the analysis could provide an indication about whether any of the alternate paths are better than the path presently in use by more than a threshold amount. In that event, the call will only be switched to an alternate path if the alternate path offers a significantly better call quality than the path presently in use.

By adjusting the value of X in this method, one can adjust how often the paths are re-tested. This value could be adjusted over time to balance the need to maintain high call quality against the extra signaling that must occur to accomplish the retesting.

Figure 10:
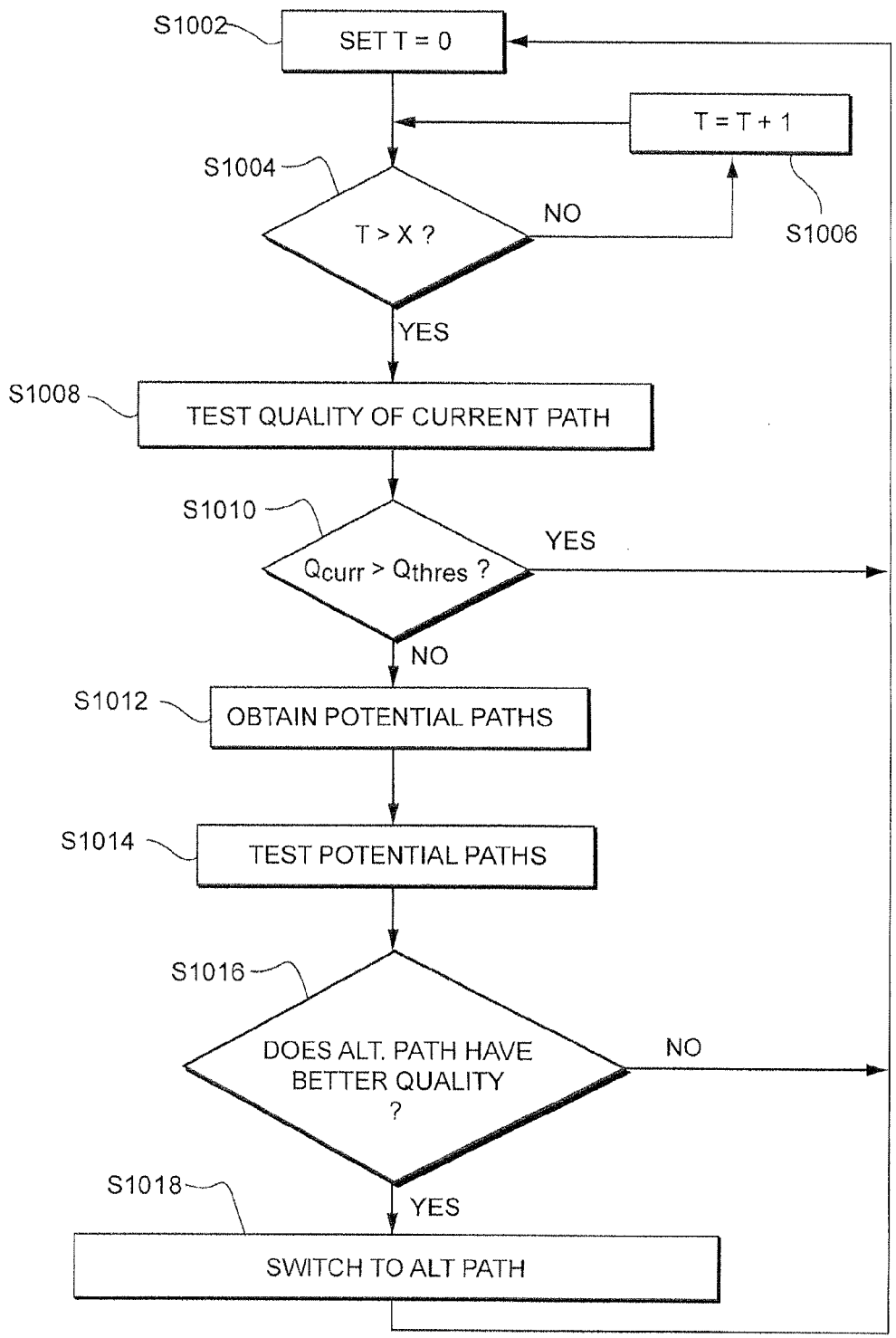
FIG. 10 is a diagram illustrating steps of another method of monitoring call quality and rerouting a call.

FIG. 10 illustrates an alternate method of monitoring call quality and deciding whether to switch to an alternate path. This method begins in step S1002, where a time counter T is set to 0. The method proceeds to step S1004, where a check is performed to determine if the value of the time counter T exceeds a predetermined value X. If not, the method proceeds to step S1006, where the time counter T is indexed. The method then loops through steps S1004 and S1006 until the value of the time counter T is greater than X, at which point the method proceeds to step S1008.

In step S1008, only the path currently in use is retested for call quality. The method then proceeds to step S1010, where a determination is made about whether the current call quality is higher than a threshold level. If the current call quality exceeds the threshold, the method loops back to step S1002, and the above-described steps are repeated.

If the determination made in step S1010 indicates that the current call quality is lower than the threshold level, the method proceeds to step S1012 where the potential paths for the call are again obtained. In some embodiments, this step would not be performed, and the list of potential paths that were originally obtained during the call setup would be reused.

In step S1014, all the potential paths are re-tested for call quality. Then, in step S1016, a determination is made about whether any of the alternate paths provide better call quality that the path that is currently in use. In not, the method loops back to step S1002, and all the above steps are repeated. If so, the call is switched to the alternate path offering the best call quality. The method then loops back to step S1002.

Here again, the analysis performed in step S1016 could simply be a determination about whether any of the alternate paths offer better call quality than the path presently in use. In alternate embodiments, the analysis could provide an indication about whether any of the alternate paths are better than the path presently in use by more than a threshold amount. In that event, the call will only be switched to an alternate path if the alternate path offers a significantly better call quality than the path presently in use.

In the method illustrated in step 10, the quality of all the potential paths is only retested if the quality of the path present in use falls below a threshold value. Thus, the method illustrated in FIG. 10 will likely result in less signaling to maintain call quality, as compared to the method illustrated in FIG. 9, where the quality of all paths is retested on a periodic basis.

In the methods described above, the paths that were tested and the paths that were used included two media relays through which data packets are to be routed as the data packets pass back and forth between two telephony devices. In alternate embodiments, the path may only comprise a single media relay, or the path could include more than two media relays.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of routing a Voice over Internet Protocol communication, comprising:
   receiving, at an originating user telephony device, a request to setup a communications channel between the originating user telephony device and a destination telephony device;
   establishing the requested communications channel over an initial media path;
   testing, via the originating user telephony device, a quality of the initial media path on a periodic basis after the communications channel has been established;
   determining a communications quality of the initial media path after each occurrence of the periodic testing; and
   causing the communications channel to switch from the initial media path to an alternate media path when the communications quality of the initial media path is lower than a predetermined threshold quality level, wherein the causing step comprises:
      testing, via the originating user telephony device, a quality of one or more alternate media paths for the communications channel;
      determining when the communications quality of at least one of the one or more alternate media paths is higher than the communications quality of the initial media path; and
      switching the communications channel from the initial media path to one of the one or more alternate media paths that has a quality higher than the initial media path when the communications quality of at least one of the one or more alternate media paths is higher than the communications quality of the initial media path.

2. The method of claim 1, wherein the step of testing a quality of the initial media path comprises obtaining a plurality of measures of data packet transmission statistics for the initial media path.

3. The method of claim 2, wherein the plurality of measures of data packet transmission statistics for the initial media path are combined to obtain the measure of a communications quality of the initial media path.

4. The method of claim 1, wherein the switching step comprises switching the communications channel to the alternate media path when the communications quality of the alternate media path is higher than the communications quality of the initial media path by more than a threshold amount.

5. The method of claim 1, wherein the step of causing the communications channel to switch from the initial media path to an alternate media path further comprises identifying at least one alternate media path that could be used for the communications channel.

6. The method of claim 5, wherein the step of identifying at least one alternate media path comprises identifying, for each alternate media path, at least one media relay through which the communications channel could be established.

7. The method of claim 5, wherein the identifying step comprises sending communications to and receiving communications from the destination telephony device, the communications being used to identify the at least one alternate path for the communications channel.

8. The method of claim 5, wherein the identifying step comprises obtaining, from a routing engine of an Internet protocol telephony system, a list of potential media paths for the communications channel.

9. A non-transitory computer readable medium having instructions stored thereon, which when executed cause one or more computers to perform a method comprising:
   receiving, at an originating user telephony device, a request to setup a communications channel between the originating user telephony device and a destination telephony device;
   establishing the requested communications channel over an initial media path
   testing, via the originating user telephony device, a quality of the initial media path on a periodic basis after the communications channel has been established;
   determining a communications quality of the initial media path after each occurrence of the periodic testing; and
   causing the communications channel to switch from the initial media path to an alternate media path when the communications quality of the initial media path is lower than a predetermined threshold quality level, wherein the causing step comprises:
      testing, via the originating user telephony device, a quality of one or more alternate media paths for the communications channel;
      determining when the communications quality of at least one of the one or more alternate media paths is higher than the communications quality of the initial media path; and
      switching the communications channel from the initial media path to one of the one or more alternate media paths that has a higher quality than the initial media path when the communications quality of at least one of the one or more alternate media paths is higher than the communications quality of the initial media path.

10. The non-transitory computer readable medium of claim 9, wherein the step of testing a quality of the initial media path comprises obtaining a plurality of measures of data packet transmission statistics for the initial media path.

11. The non-transitory computer readable medium of claim 10, wherein the plurality of measures of data packet transmission statistics for the initial media path are combined to obtain the measure of a communications quality of the initial media path.

12. The non-transitory computer readable medium of claim 9, wherein the switching step comprises switching the communications channel from the initial media path to the alternate media path when the communications quality of the alternate media path is higher than the communications quality of the initial media path by more than a threshold amount.

13. The non-transitory computer readable medium of claim 9, wherein the step of causing the communications channel to switch from the initial media path to an alternate media path further comprises identifying at least one alternate media path that could be used for the communications channel.

14. The non-transitory computer readable medium of claim 13, wherein the step of identifying at least one alternate media path comprises identifying, for each alternate media path, at least one media relay through which the communications channel could be established.

15. The non-transitory computer readable medium of claim 13, wherein the identifying step comprises sending communications to and receiving communications from the destination telephony device, the communications being used to identify the at least one alternate media path for the communications channel.

16. The non-transitory computer readable medium of claim 13, wherein the identifying step comprises obtaining, from a routing engine of an Internet protocol telephony system, a list of potential media paths for the communications channel.

\* \* \* \* \*